(12) United States Patent
Christensen

(10) Patent No.: US 8,093,861 B2
(45) Date of Patent: Jan. 10, 2012

(54) POWER TRANSFER SYSTEM FOR A RECHARGEABLE BATTERY

(75) Inventor: Peter Wilmar Christensen, Holte (DK)

(73) Assignee: Greenwave Reality, PTE Ltd., Singapore (SG)

( * ) Notice: Subject to any disclaimer, the term of this patent is extended or adjusted under 35 U.S.C. 154(b) by 173 days.

(21) Appl. No.: 12/709,510

(22) Filed: Feb. 21, 2010

(65) Prior Publication Data

US 2011/0156651 A1    Jun. 30, 2011

(51) Int. Cl.
*H02J 7/00* (2006.01)

(52) U.S. Cl. .......................................... 320/109; 320/128

(58) Field of Classification Search .................. 320/109, 320/128

See application file for complete search history.

(56) References Cited

U.S. PATENT DOCUMENTS

| | | | |
|---|---|---|---|
| 4,309,644 A * | 1/1982 | Reimers et al. | 318/139 |
| 5,327,066 A * | 7/1994 | Smith | 320/109 |
| 5,642,270 A | 6/1997 | Green et al. | |
| 5,710,502 A * | 1/1998 | Poumey | 320/108 |
| 7,590,472 B2 | 9/2009 | Hakim et al. | |
| 2005/0134225 A1 | 6/2005 | Mese et al. | |
| 2005/0242777 A1 | 11/2005 | Van Beek et al. | |
| 2006/0164035 A1 | 7/2006 | Van Beek et al. | |
| 2008/0203973 A1 | 8/2008 | Gale et al. | |
| 2009/0021213 A1 | 1/2009 | Johnson | |
| 2009/0062967 A1 | 3/2009 | Kressner et al. | |
| 2009/0210357 A1 | 8/2009 | Pudar et al. | |

FOREIGN PATENT DOCUMENTS

| | | |
|---|---|---|
| GB | 2315933 A | 2/1998 |
| GB | 2446694 A | 8/2008 |
| JP | 2006238598 A | 7/2006 |
| WO | 2009012018 A2 | 1/2009 |
| WO | 201103249 A2 | 8/2011 |

OTHER PUBLICATIONS

Nick Chambers, How to Build and Electric Car Charging Infrastructure, Jul. 24, 2008.
Josie Garthwaite, Sneak Peek: GridPoint Unveils Smart Charging 3.0, Aug. 11, 2009.
Annie Jia, Vehicle-To-Grid Technology Gains Some Traction, Jul. 22, 2009, The New York Times.
Josie Garthwaite, Nissan Unveils Tools for a Truly Networked Electric Car, Jul. 27, 2009.
Alec Brooks, Smarter Charging, Feb. 5, 2008.
The International Search Report and the Written Opinion for PCT/US2011/025173, European Patent Office, Oct. 20, 2011.

* cited by examiner

*Primary Examiner* — M'Baye Diao
(74) *Attorney, Agent, or Firm* — Bruce A. Young (57) ABSTRACT

An apparatus and method for transferring energy between a rechargeable battery and a power distribution network. The minimum final energy level may be determined at least in part from the historical energy levels and usage of the rechargeable battery. The time of day of charging the battery may be determined at least in part from information provided by the energy provider.

19 Claims, 7 Drawing Sheets

POWER TRANSFER SYSTEM FOR A RECHARGEABLE BATTERY

BACKGROUND

1. Field of the Invention

The present disclosure relates to a device and method of transferring power between rechargeable batteries that may be used in Electric Vehicles (EVs) and an energy distribution network.

2. Discussion of the Related Art

EV batteries may be charged from an energy distribution network, the energy distribution network is sometimes referred to as the energy grid. U.S. Pat. Nos. 5,642,270 and 7,590,472 as well as US patent applications 2008/0203973 entitled INTERACTIVE BATTERY CHARGER FOR ELECTRIC VEHICLE and 2009/0021213 entitled METHOD FOR PAY-PER-USE, SELF-SERVICE CHARGING OF ELECTRIC AUTOMOBILES address various methods and apparatus of recharging EV batteries, however, each one of these references suffers from one or more disadvantages.

For the foregoing reasons there is a need for an improved system to transfer energy between the power distribution network and a rechargeable battery.

SUMMARY

Transportation using carbon based fuel vehicles contributes pollution to the environment. The cost of fuel for these vehicles is rising making alternatively fueled vehicles more attractive. EVs are one such alternatively powered vehicle. The present disclosure is directed to a power transfer system for a rechargeable battery and a method of transferring power for a rechargeable battery.

The present disclosure includes improvements of calculating the required final charge level of the battery based on historical usage data and a system communicating with an energy provider to maximize the use of renewable energy.

In one aspect of the disclosure, a power transfer system may comprise a power transfer apparatus electrically coupled to a rechargeable battery. The rechargeable battery includes an energy capacity and an energy level. A controller is communicatively coupled to the power transfer apparatus. The controller has a memory that contains temporal energy usage data. The controller is configured to determine a predicted disconnect time when the battery is to be uncoupled from the power transfer apparatus based upon the temporal energy usage data. A monitor is electrically coupled to the battery and communicatively coupled to the controller. The controller receives the battery energy level from the monitor. The controller is configured to determine a minimum final energy level for the battery; the minimum final energy level is less than the energy capacity of the battery and based upon the temporal energy usage data. The controller is configured to determine an energy transfer rate and a minimum energy transfer interval. The minimum energy transfer interval is based upon the minimum final energy level, the energy transfer rate and the battery energy level. The controller communicates with the power transfer apparatus to initiate an energy transfer with the battery of duration of at least the minimum energy transfer interval. The energy transfer ending before the predicted disconnect time.

In another aspect of the disclosure, a method of transferring energy between a rechargeable battery and a power transfer apparatus comprises receiving an energy level from a rechargeable battery having an energy capacity. The method may further comprise storing temporal energy usage, and determining a predicted disconnect time when the rechargeable battery will be uncoupled from a power transfer apparatus. The method may include determining a minimum final energy level for the rechargeable battery, the minimum final energy level being less then the energy capacity and the minimum final energy level being determined based in part upon the stored temporal energy usage. The method may include determining an energy transfer rate. The method may include determining a minimum energy transfer interval based in part upon the minimum final energy level, the energy transfer rate, and the battery energy level. The method may include initiating an energy transfer, the energy transfer occurring for at least the minimum determined interval and ending before the predicted disconnect time.

BRIEF DESCRIPTION THE DRAWINGS

These and other features, aspects, and advantages of the present disclosure will become better understood with regard to the following description, appended claims, and accompanying drawings where:

DESCRIPTION

Aspects of the disclosure are disclosed in the following description and related drawings directed to specific embodiments of the disclosure. Alternate or modified embodiments may be devised without departing from the scope of the disclosure. Additionally, well-known elements of the disclosure will not be described in detail or will be omitted so as not to obscure the relevant details of the disclosure.

Figure 1:
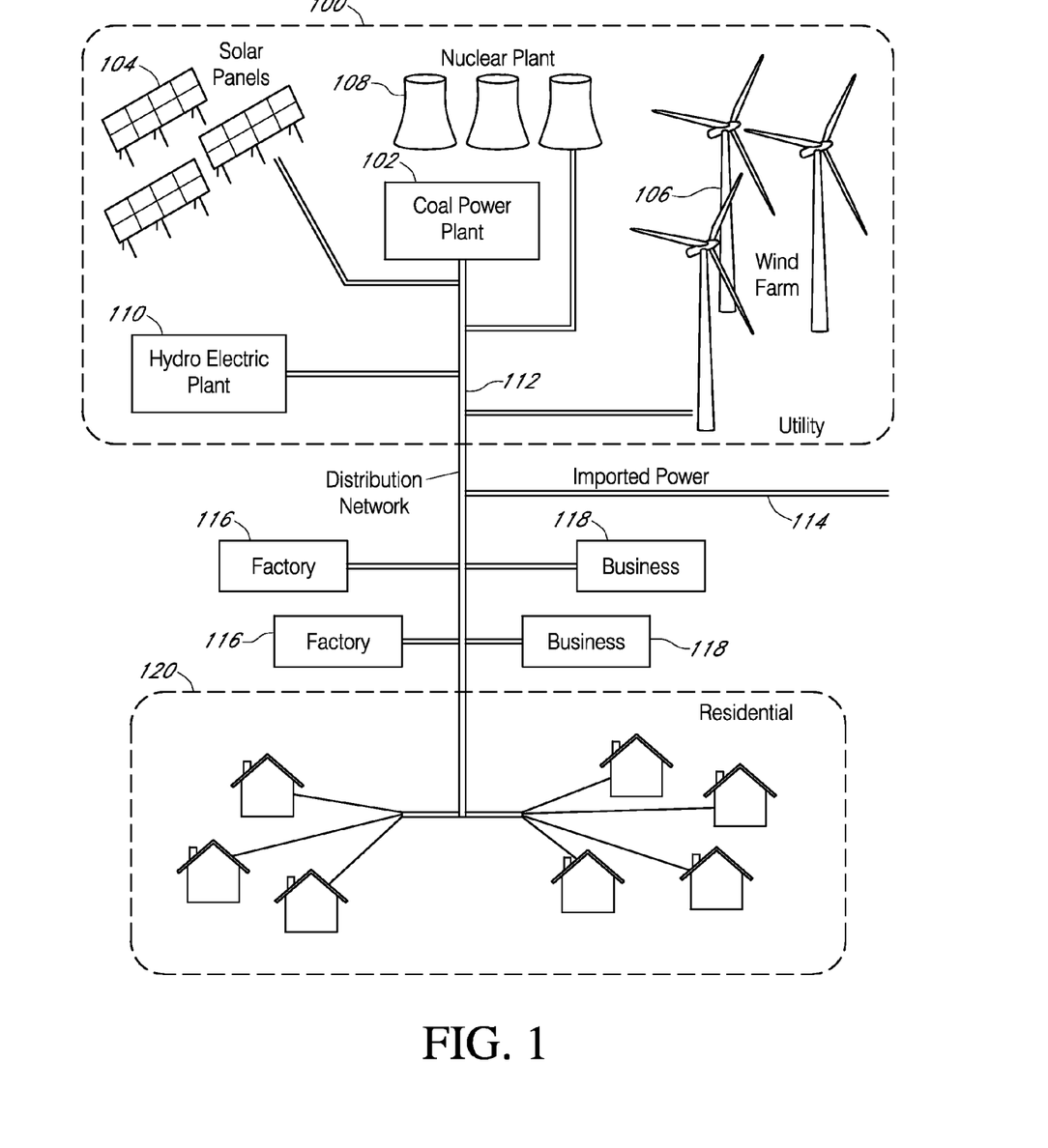
FIG. 1 is a schematic diagram showing an energy distribution network and typical connections to the energy distribution network.

FIG. 1 shows an energy provider 100 that may control multiple energy generating features. Several possible energy generating features are shown such as a coal power plant 102, solar panels 104, a wind farm 106, a nuclear plant 108, and a hydro electric plant 110. There may also be generating features not controlled by the energy provider. The generating features are connected to an energy distribution network 112. The energy distribution network 112 may also be known as the energy grid or the electric grid. If the generating features controlled by the energy provider 100 do not generate enough energy to meet the energy demand on the energy distribution network 112, the energy provider 100 may import power 114 from other energy utilities. Importing power is not optimal for the energy provider 100 as the energy provider 100 typically pays higher rates for imported energy 114 than it costs for the energy provider 100 to generate the power locally. One reason for the higher rates may be transmission loss. The energy is distributed over the energy distribution network 112 to consumers of the energy. Several possible energy consumers are shown such as factories 116, businesses 118, and residential areas 120.

Figure 2:
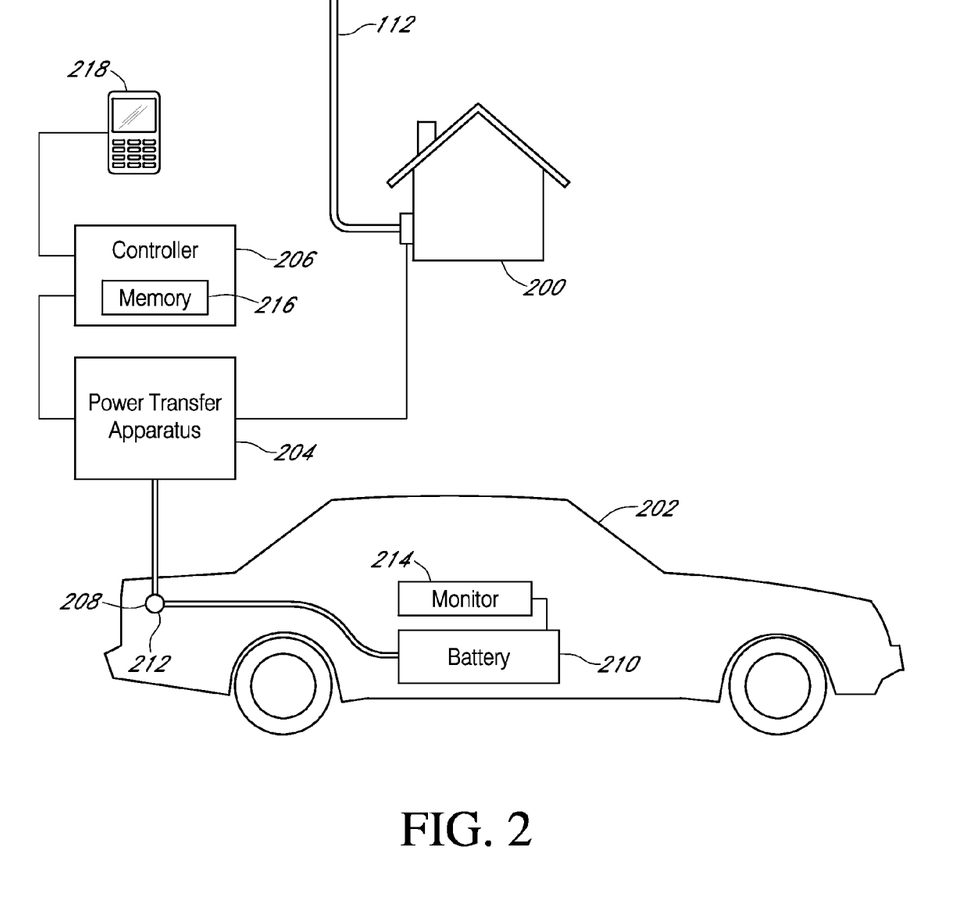
FIG. 2 is a schematic diagram of a energy transfer system.

FIG. 2 shows the energy distribution network 112 distributing energy to a residence 200. The residence 200 may include a system to transfer energy to an electric vehicle 202. The electric vehicle 202 stores energy in a battery 210. The battery 210 may be composed of one enclosure containing one or more cells. In another embodiment the battery 210 may be composed of multiple enclosures each enclosure containing one or more cells. The cells may be lead-acid, lithium-ion, lithium iron phosphate, lithium sulfur, lithium titanate, nickel cadmium, nickel iron, nickel hydrogen, nickel metal hydride, nickel zinc, or other composition. It is also anticipated that the electric vehicle 200 may optionally use other energy storage devices such as capacitors, compressed air, inertial devices, or other energy storing devices. The battery 210 may be electrically connected to a battery connector 212. In one embodiment, the battery connector 212 is enclosed in a single unit. In some embodiments, the battery connector 212 has multiple connectors. In one embodiment, the battery connector 212 has a plurality of connectors, with a male connector connected to the positive battery connection and a female connector connected to the negative battery terminal. In other embodiments, the battery connector 212 has a plurality of connectors, with a female connector connected to the positive battery terminal and a male connector connected to the negative battery terminal. The battery 210 may be electrically coupled to a monitor 214. The monitor 214 may measure and report the energy level of the battery 210. The monitor 214 may calculate the energy usage and energy level of the battery 210 by measuring one of more of the following parameters of the battery 210: temperature, current, or voltage. Batteries that include such a monitor 214 are sometimes referred to as smart batteries. The monitor 214 may report the energy level of the battery 210 in energy units such as kilowatt hours or the monitor 214 may report the energy level of the battery 210 in percentage of the battery capacity. The monitor 214 may report the energy level of the battery to devices internal to the electric vehicle 202 allowing the driver of the electric vehicle 202 to assess the energy level of the battery 210.

A power transfer apparatus 204 is electrically coupled to the energy distribution network 112. The power transfer apparatus 204 facilitates the transfer of energy between the energy distribution network 112 and the battery 210. The power transfer apparatus 204 may include a transformer to match the voltage of the energy distribution network 112 and the battery 210. The power transfer apparatus 204 may also include a rectifier to convert AC energy into DC energy. The power transfer apparatus 204 may also include an inverter to convert DC energy into AC energy. The power transfer apparatus 204 may include circuits to control the voltage and current of the energy being transferred. In one embodiment, the power transfer apparatus both transfers energy from the energy distribution network 112 to the battery 210 and transfers energy from the battery 210 to the energy distribution network 112. Transferring energy from the energy distribution network 112 to the battery 210 may be referred to as charging the battery 210. Transferring energy from the battery 210 to the energy distribution network 112 may be referred to as a vehicle to grid transfer. The power transfer apparatus 204 may be electrically connected to a power transfer apparatus connector 208. The power transfer apparatus connector 208 may be designed to mate with the battery connector 212. In one embodiment an adapter may be used to facilitate mating between the battery connector 212 and the power transfer apparatus connector 208. In one embodiment, the power transfer apparatus connector 208 and the battery connector 212 are designed to be conductively coupled. In another embodiment, the power transfer apparatus connector 208 and the battery connector 212 are designed to be inductively coupled.

The controller 206 may be communicatively coupled to the power transfer apparatus 204. The controller 206 may signal the power transfer apparatus 204 when to start the energy transfer and the controller 206 may also signal the power transfer apparatus 204 when to stop the energy transfer. The controller 206 may also be communicatively coupled to the monitor 214. In an embodiment the coupling between the controller 206 and the monitor 214 is a wireless mesh network. The controller 206 may receive from the monitor 214 status information for the battery 210. The battery 210 status information may include, among other things, battery capacity, battery energy level, energy usage, and battery temperature. The controller 206 may include a memory 216 for storing temporal energy usage data 300. In one embodiment, the memory 216 may be DRAM (dynamic random access memory). In other embodiments, the memory 216 may be flash memory or a hard disk drive.

Figure 3:
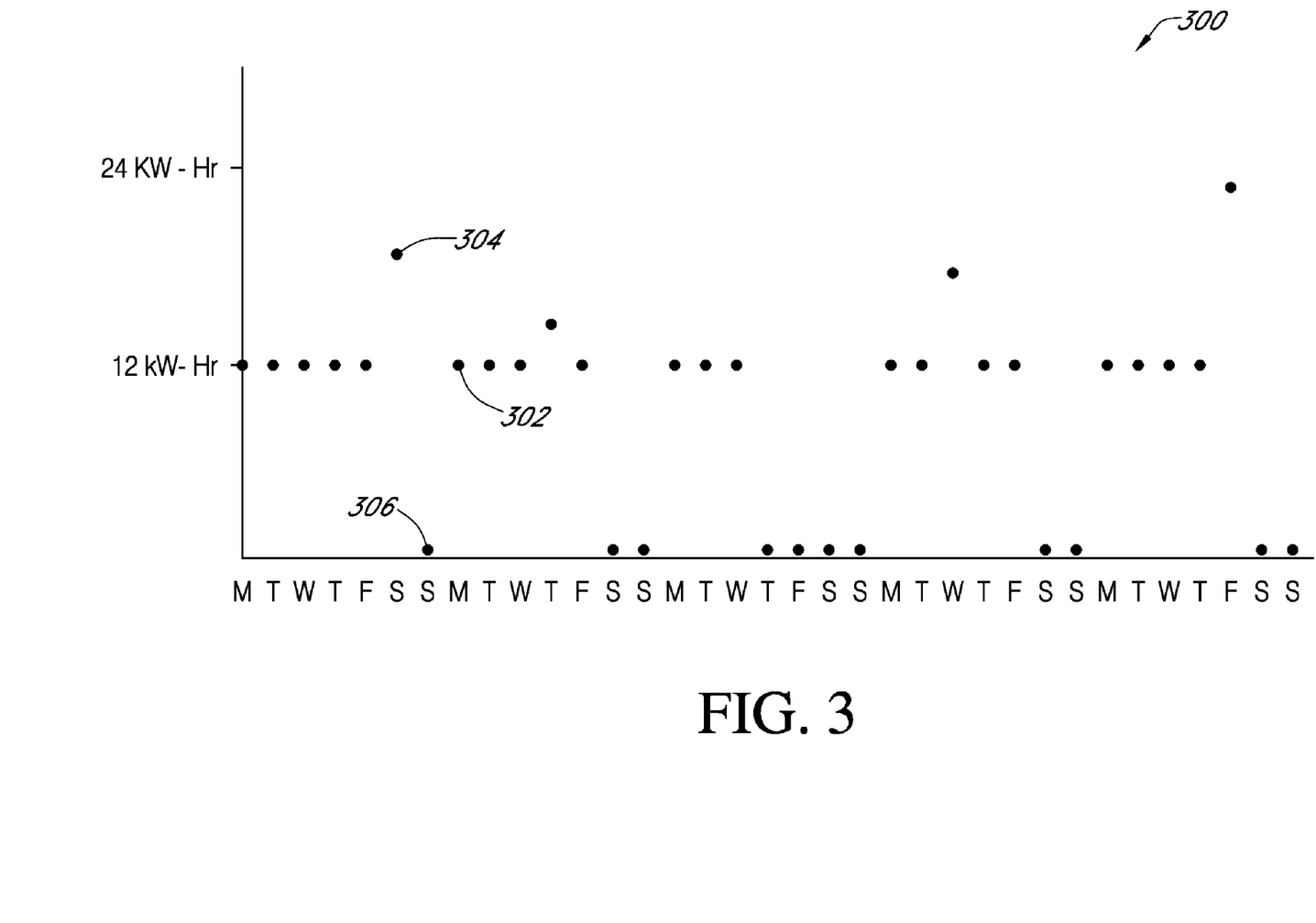
FIG. 3 is a graph depicting temporal energy usage data.
Figure 4:
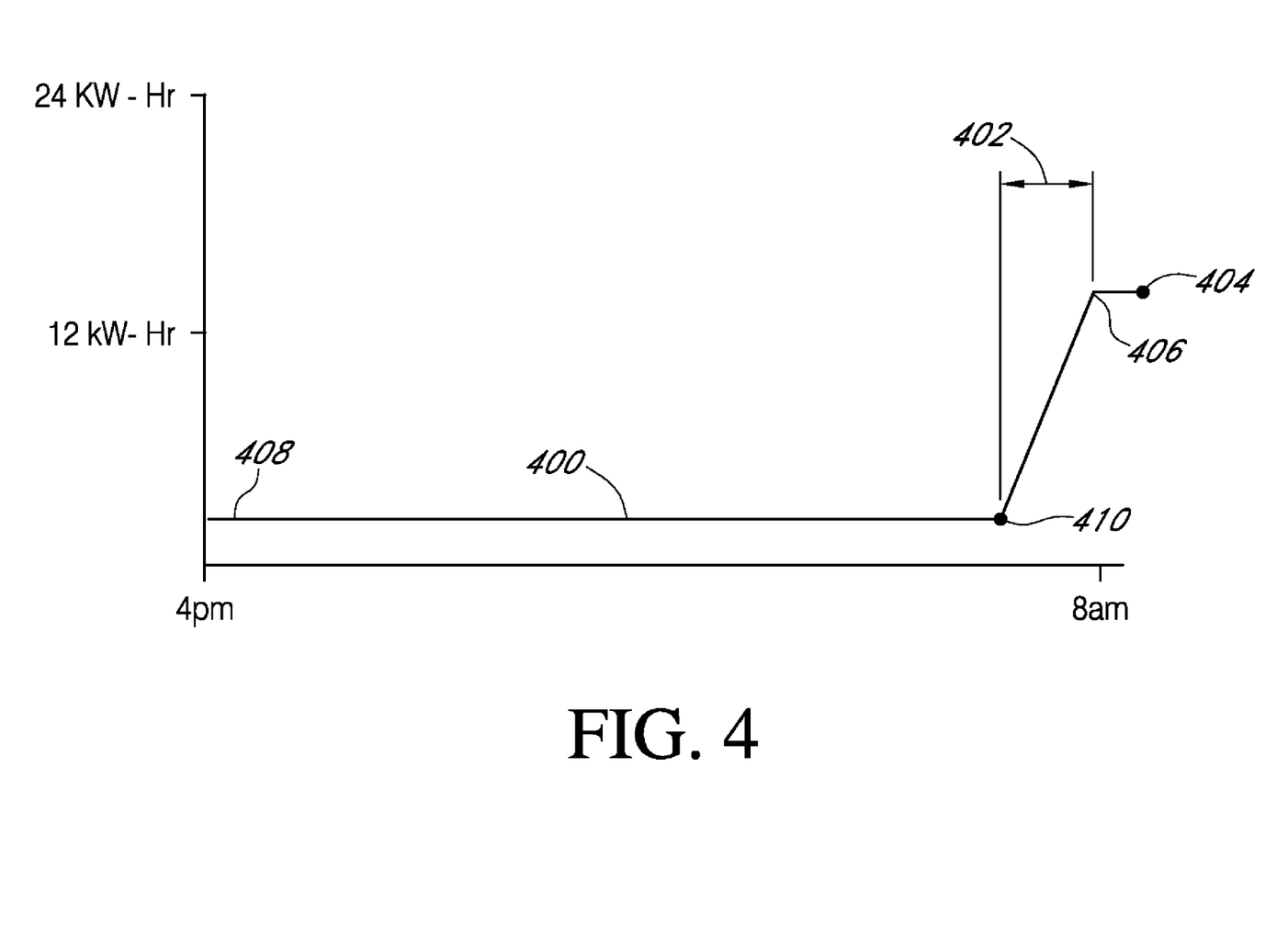
FIG. 4. is a graph depicting a battery energy level over time.

The controller 206 may use the stored temporal energy usage data 300 to determine the minimum final energy level 406 of the battery 210. The minimum final energy level 406 is the calculated minimum charge level the battery 210 will have following the energy transfer. The minimum final energy level 406 is determined at least in part by the amount of energy typically used between energy transfers as reported by the temporal energy usage data 300. The minimum final energy level 406 may also include a constant offset allowing a safety margin. In one embodiment, the minimum final energy level 406 is determined by adding a constant offset to the amount of energy typically used between energy transfers as reported by the energy usage data 300.

The controller 206 also has access to the energy transfer rate of the power transfer apparatus 204. In one embodiment, the energy transfer rate of the power transfer apparatus 204 may be positive, indicating transfer of energy from the energy distribution network 112 to the battery 210, or negative, indicating transfer of energy from the battery 210 to the energy distribution network 112. The energy transfer rate may be dictated by, among other things, the current, voltage, internal resistance of the battery 210, and the power availability from the energy distribution network 112.

FIG. 3 shows temporal energy usage data 300, shown in units of KW*Hr, which may include various time related aspects of the usage of energy by the battery over a period of time. In some embodiments, the temporal energy usage data 300 may include data on usage on a day by day basis, for each day of the week, each day of the month, or any other time points in a given time period. The usage data 300 may extend over more than one time period, and thus may include daily usage amounts for multiple weeks, or multiple months. In this example, the energy usage values are listed by the day of the week for the past 5 weeks with MTWTFSS on the X axis representing time and labeled with the corresponding days of the week. In this example, a typical energy usage 302 is 12 KW*Hr. This value could be higher or lower depending on many factors one of which is a daily commute. In this example, some days there is no energy usage 306. This may be weekend days when the electric vehicle is not used, or other days, such as holidays. In this example, some days are above the typical usage 304. The controller 206 processes the temporal energy usage data 300 in determining the minimum final energy level 406. The amount of energy usage data that is stored may vary.

Regarding the example shown in FIG. 4, the predicted disconnect time 404 is the expected time when the battery is uncoupled from the power transfer apparatus 204. In one embodiment, this time is when the electric vehicle 202 is used for transportation. The predicted disconnect time 404 may be calculated from previous disconnect times, or may be entered by a user interface 218. In one embodiment, the minimum final energy level 406, the initial battery energy level 408, and the energy transfer rate, are used to predict the amount to time the energy transfer will take. This time may be referred to as the energy transfer interval 402. In one embodiment the energy transfer interval 402 may be subtracted from the predicted disconnect time 404 so the minimum final energy level 406 is achieved before the predicted disconnect time 404. Using the numbers from the example the following values may be determined by the controller 206:

Energy transfer interval 402=(Minimum Final Energy Level 406−Initial Energy Level 408)/energy transfer rate.

Energy transfer interval 402=(13 KW*Hr−1 KW*Hr)/7 KW

Energy transfer interval 402≈1.7 hours.

In this example the initial battery energy level 408 is about 1 KW*Hr. In this example, the minimum final energy level 406 is about 13 KW*Hr, the minimum final energy level 406 being the typical weekday energy usage of 12 KW*Hr plus a 1 KW*Hr margin. In this example, the energy transfer rate is about 7 KW. In this example the predicted disconnect time 404 is about 8:00 am. An energy transfer interval 402 of 1.7 hours would therefore need an energy transfer start time 410 of no later than about 6:20 am.

Figure 5:
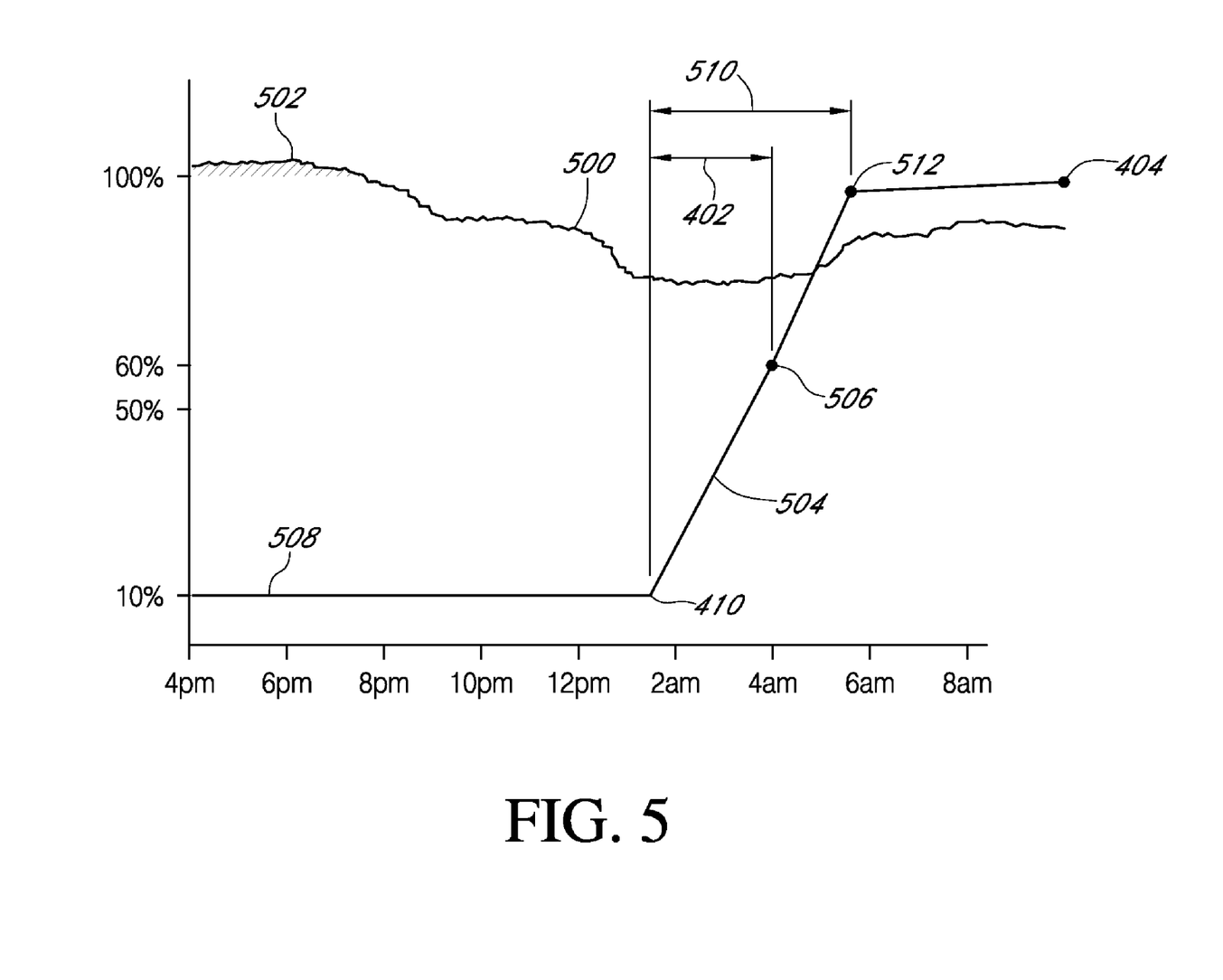
FIG. 5 is a graph depicting battery energy level over time in units of percentage of battery capacity, and energy demand on an energy distribution network in units of percentage of local generation capacity.

In an embodiment, the controller 206 may be communicatively coupled with the energy provider 100. In an embodiment, a Zigbee, or a Z-Wave network communicatively couples the controller 206 with the energy provider 100. This communication enables the energy provider 100 to provide the controller 206 with among other data, the customer energy demand, the local generation capacity, and the renewable energy percentage 600. FIG. 5 shows energy demand 500, as a percentage of local generation capacity, of the energy provider 100. The energy demand 500 is sometimes referred to as the load of the energy distribution network 112. The energy transfer schedule of the vehicle may be responsive to the magnitude of the overall energy demand 500 placed upon the energy provider 100 at various times during the day, and in response to communication from the energy provider 100 that the energy demand has exceeded a predetermined level or condition, such as the condition where energy demand has exceeded the provider's immediate ability to generate power, and must buy energy from other sources. In an example depicted in FIG. 5, the energy demand is shown in units of percentage of the generation capacity of the energy provider 100. An energy demand 500 value of more than 100% 502 indicates the demand for energy is greater than the local generation capacity of the energy provider 100. When the energy demand is greater than the local generation capacity 502 the energy provider must import power 114 from other utilities or sources. In this example, the energy demand 500 drops below 100% at about 8:00 pm and the energy demand 500 drops again at about 1:30 am. At about 2:00 am the controller 206 receives a signal from the energy provider 100 to start the energy transfer 410. At about 4:40 am, the minimum energy transfer interval 402 has been fulfilled and the energy level 504 has reached the minimum final energy level 506, because the energy demand 500 is still low, the energy transfer continues for an extended energy transfer interval 510. The energy transfer continues until the battery energy level 504 reaches approximately 100% of the battery capacity 512. In other examples, the energy transfer may continue after the minimum final energy level 506 has been reached and the energy transfer may stop before the battery energy level 504 reaches 100% of the battery capacity 512 if the energy demand 500 goes above a predetermined threshold level of energy demand.

Figure 6:
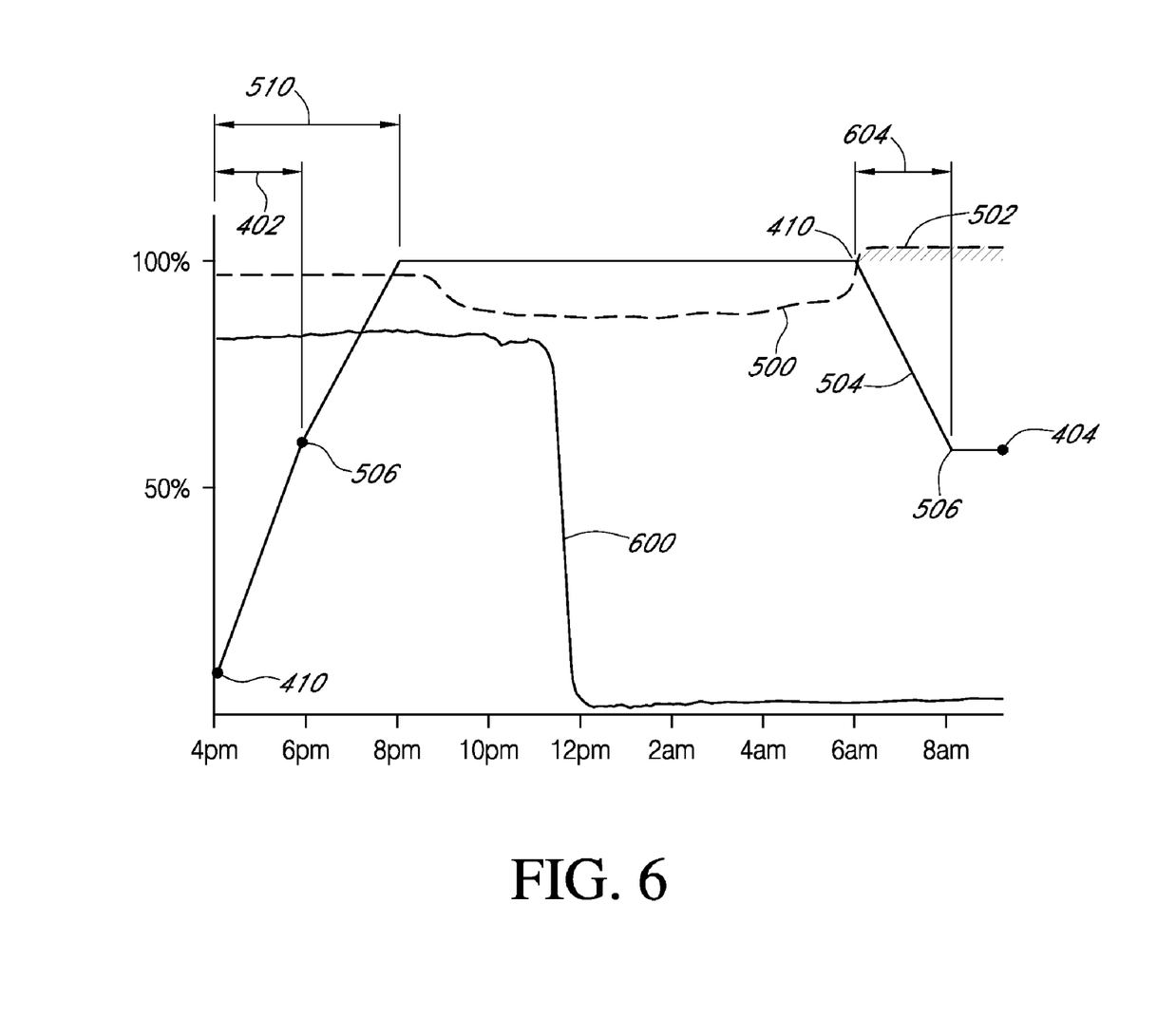
FIG. 6 is a graph depicting battery energy level over time in units of percentage of battery capacity, energy demand on an energy distribution network in units of percentage of local generation capacity, and renewable energy supply in units of percentage of local generation capacity.

FIG. 6 includes a renewable energy percentage 600 in units of percent of total generated energy. The energy transfer schedule of the vehicle may be responsive to the availability of energy from certain sources, such as sources considered to be renewable energy sources (which may include wind, solar, hydroelectric) as opposed to more conventional carbon fuel-based energy generation sources. Further, the degree to which the battery is charged may be dependent upon the availability of energy from the renewable energy sources. In an example depicted in FIG. 6, the energy demand information 500 and the percentage of renewal energy 600 may be received among other information by the controller 206. In alternative embodiments, the energy demand 500 and percentage of renewable energy may be utilized at least in part for the energy provider 100 to determine optimal energy transfer times and the energy transfer start time 410 is communicated to the controller 206. In an example depicted in FIG. 6, the energy demand 500 is relatively high at 4:00 pm, however there is a high percentage of renewable energy 600 meeting the energy demand 500. The high percentage of renewable energy 600 may for example be caused by a sunny day causing solar panels 104 to generate power. The high percentage of renewable energy may for example be caused by a windy day causing wind farms 106 to generate power. In this example the percentage of renewable energy 600 drops at about 11:00 pm. One possible example of the renewable energy dropping may be that the wind stopped. In this example, at about 4:00 pm the controller 206 receives a signal from the energy provider 100 to start the energy transfer 410. In this example, at about 5:40 pm, the minimum energy transfer interval 402 has been fulfilled and the energy level 504 has reached the minimum final energy level 506. In this example, because the percentage of renewable energy 600 is still high, the energy transfer continues for an extended energy transfer interval 510. In this example the energy transfer continues until the battery energy level 504 reaches 100% of the battery capacity 512. In other examples, the energy transfer may continue after the minimum final energy level 506 has been reached and the energy transfer may stop before the battery energy level 504 reaches 100% of the battery capacity 512 if the percentage of renewable energy 600 goes below a threshold, or the if the energy demand 500 goes above a threshold. In this example, at about 6:00 am the energy demand 500 goes above 100% 502. Energy is transferred from the battery 210 to the energy distribution network 112 until the battery energy level 504 reaches the minimum final energy level 506. This allows the energy provider 100 to use the excess energy stored in the battery 210 to meet the energy demand effectively reducing the energy the energy provider 100 must import 114 to meet demand.

Figure 7:
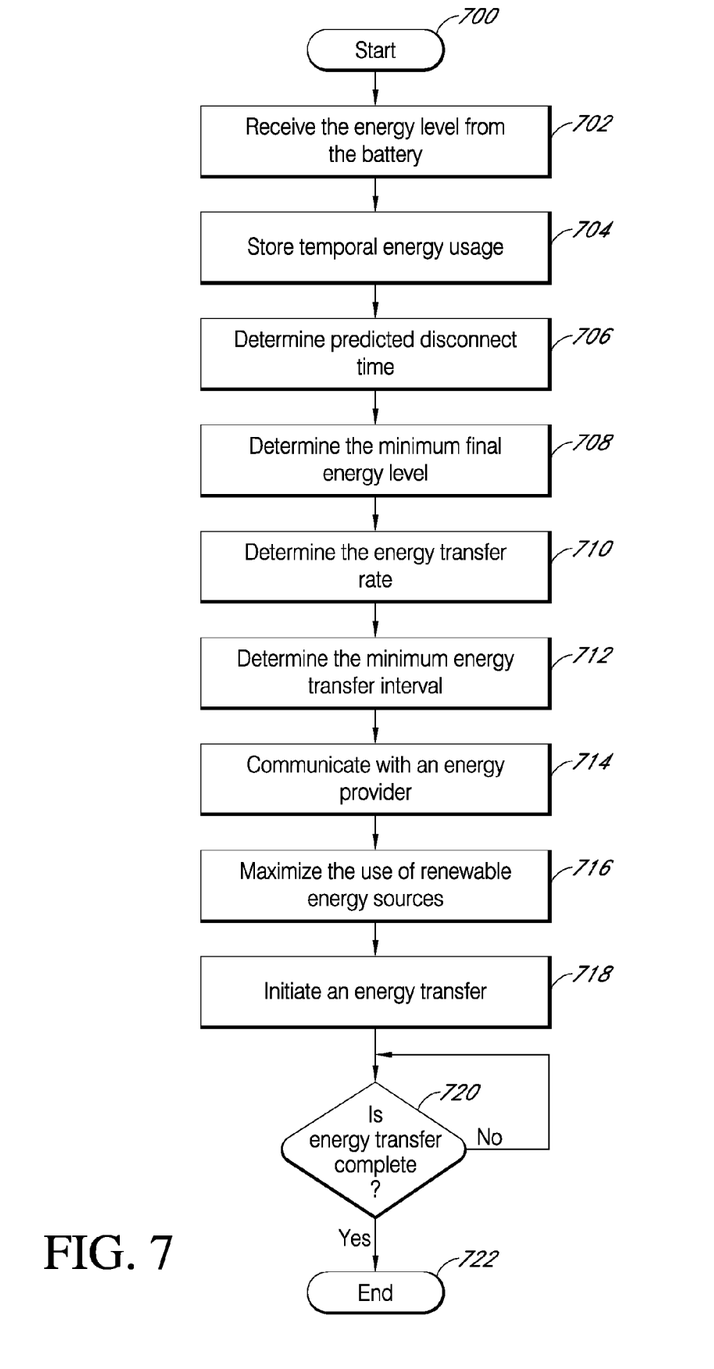
FIG. 7 is a diagram of the method steps of transferring energy between a rechargeable battery and a power transfer apparatus.

FIG. 7 depicts a method for transferring energy between a rechargeable battery 210 and a power transfer apparatus 204 that is coordinated by the controller 206. When actuated at 700, the controller 206 receives at 702 the initial battery energy level 408 from the monitor 214. In step 704 the controller 206 stores the energy usage in the memory 216. In one embodiment, the energy usage is calculated by subtracting the initial battery energy level 408 from the final energy level of the previous energy transfer. In another embodiment, the energy usage is received directly from the monitor 214. In step 706 the controller 206 determines the predicted disconnect time 404. The predicted disconnect time 404 may be calculated from previous disconnect times, or may be entered by a user interface 218. In step 708 the controller 206 calculates the minimum final energy level 406. As noted above, the minimum final energy level 406 is the level of energy typically used between energy transfers as reported by the temporal energy usage data 300, and may also include a constant offset. In step 710, a determination of the energy transfer rate may be made. The energy transfer rate may be dictated by, among other things, the current, voltage, internal resistance of the battery 210, and the power availability from the energy distribution network 112. Using the minimum final energy level 406 and the energy transfer rate, the minimum energy transfer interval 402 may be determined at step 712. In one embodiment, step 714, the controller 206 communicates with an energy provider 100. In another embodiment, the controller 206 receives data from the energy provider 100, and the data may include the energy demand 500 on the energy distribution network 112. In yet another embodiment, the data may include the amount of renewable energy available on the energy distribution network 112 allowing the controller 206 maximize the use of renewable energy at step 716. The renewable energy available on the energy distribution network 112 may be reported to the controller 206 as renewable energy percentage 600 in units of percent of total generated energy. In step 718, the energy transfer is initiated for a minimum duration of the minimum energy transfer interval 402. In step 720 the controller 206 monitors the energy transfer and determines if the energy transfer is complete. In one embodiment, the energy transfer is complete after the minimum energy transfer interval 402 has expired and the minimum energy transfer level 406 has been achieved. In another embodiment, the energy transfer continues after the minimum energy transfer interval has expired, until the battery energy level reaches approximately full capacity. In yet another embodiment, after the battery energy level reaches approximately full capacity, energy is transferred from the battery 210 to the energy distribution network 112. For example, charging the battery 210 to more than the minimum final energy level 406 using renewable energy sources allows energy from the battery 210 to be used on the energy distribution network 112 when demand exceeds local generation capacity 502. The energy transfer ends at or before the predicted disconnect time 404. When the controller 206 determines the energy transfer is complete, the recharging of the rechargeable battery 210 is substantially complete at step 722.

The disclosure has been described in detail with particular reference to certain preferred embodiments thereof, but it will be understood that variations and modifications can be effected within the spirit and scope of the disclosure.

What is claimed is:

1. A power transfer system for a rechargeable battery comprising:
   a power transfer apparatus electrically coupled to
   a rechargeable battery having an energy capacity and an energy level,
   a controller communicatively coupled to the power transfer apparatus, the controller having a memory containing temporal energy usage data, the controller being configured to determine a predicted disconnect time when the rechargeable battery is to be electrically uncoupled from the power transfer apparatus based upon the temporal energy usage data, and
   a monitor electrically coupled to the battery, the monitor communicatively coupled to the controller to send the battery energy level to the controller,
   wherein the controller is configured to determine a minimum final energy level for the battery, the minimum final energy level being less than the energy capacity of the battery, the minimum final energy level being based upon the temporal energy usage data,
   wherein the controller is configured to determine an energy transfer rate and a minimum energy transfer interval, the minimum energy transfer interval being based upon the energy transfer rate, the minimum final energy level, and the battery energy level,
   wherein the controller is configured to communicate with the power transfer apparatus to initiate an energy transfer with the battery of a duration of at least the minimum energy transfer interval, the energy transfer ending before the predicted disconnect time.

2. The system of claim 1 wherein the controller is configured to communicate with an energy provider to receive information regarding a capacity condition of an energy distribution network of the energy provider and the controller is configured to determine an energy transfer start time based upon the information regarding the capacity condition.

3. The system of claim 2 wherein the energy distribution network is characterized by a level of energy available and a current level of energy demand, wherein the controller is configured to receive information from the energy provider regarding the current level of energy demand and the level of energy available, and wherein the controller is configured to determine the energy transfer start time at least partially based upon the current level of energy demand and the level of energy available.

4. The system of claim 2 wherein the controller is configured to receive information from the energy provider regarding a level of renewable energy available on the energy distribution network, and wherein the controller is configured to determine the energy transfer start time at least partially based upon the information regarding the available level of renewable energy received.

5. The system of claim 1 therein the controller has a user interface configured to receive a value for the minimum final energy level from the user.

6. The system of claim 1 further comprising a wireless network communicatively coupling the monitor and the controller.

7. The system of claim 2 wherein the energy transfer is from the energy distribution network through the power transfer apparatus to the battery.

8. The system of claim 2 wherein the energy transfer is from the battery to the energy distribution network.

9. A method of energy transfer between a rechargeable battery and a power transfer apparatus comprising:
   receiving an energy level from a rechargeable battery having an energy capacity,
   storing temporal energy usage of the rechargeable battery,
   determining a predicted disconnect time when the rechargeable battery is to be electrically uncoupled from a power transfer apparatus,
   determining a minimum final energy level for the rechargeable battery, the minimum final energy level being less than the energy capacity, the minimum final energy level being determined based in part upon the stored temporal energy usage data, determining an energy transfer rate, determining a minimum energy transfer interval, based in part upon the minimum final energy level, the energy transfer rate, and the energy level, and initiating an energy transfer, the energy transfer occurring for at least the minimum determined interval, the energy transfer ending before the predicted disconnect time.

10. The method of claim 9 further comprising communicating with an energy provider to aid in determining an energy transfer start time.

11. The method of claim 10 further comprising maximizing the use of renewable energy sources during the energy transfer.

12. The method of claim 9 further comprising overriding the minimum final energy level.

13. The method of claim 9 further comprising increasing the energy level of the battery by the energy transfer.

14. The method of claim 9 further comprising decreasing the energy level of the battery by the energy transfer.

15. A power transfer apparatus comprising:

a power input suitable to be electrically coupled to an energy distribution network;

a connector suitable for connecting to a vehicle to charge a rechargeable battery in the vehicle;

circuitry capable of transferring energy between the power input and the connector; and a controller communicatively coupled to said circuitry;

wherein the controller is configured to:

retrieve temporal energy usage data;

determine a predicted disconnect time for the connector to be unplugged from the vehicle based on the temporal energy usage data;

receive an energy capacity and a current energy level of the rechargeable battery;

determine a minimum final energy level for the rechargeable battery based on the temporal energy usage data, said minimum final energy level being less than the energy capacity of the rechargeable battery;

calculate a minimum energy transfer interval based on said minimum final energy level and the current energy level of the rechargeable battery; and control the circuitry to transfer said energy from the power input to the connector for a time period of at least the minimum energy transfer interval, said transfer of said power ending before said predicted disconnect time.

16. The apparatus of claim 15, wherein the controller is further configured to:

communicate with a provider of energy to the energy distribution network to receive information regarding the energy distribution network; and determine an energy transfer start time based upon the information regarding the energy distribution network.

17. The apparatus of claim 16, wherein the information regarding the energy distribution network includes a level of renewable energy available on the energy distribution network.

18. The apparatus of claim 15, wherein the controller is further configured to receive information from a user interface, said information received from the user interface used to override a parameter determined based on the temporal energy usage data.

19. The apparatus of claim 15, wherein the controller is further configured to control the circuitry to transfer said energy from the connector to the power input.

* * * * *